United States Patent Office 2,985,561
Patented May 23, 1961

2,985,561

PROCESS FOR THE PRODUCING OF A SUBSTANCE WHICH CAUSES LEUCOCYTOSIS

Per Jensen Laland, Hovik, by Oslo, Sören Gustav Moe Laland, Blommenholm, near Oslo, and Jens Dedichen, Oslo, Norway, assignors of one-half each to Nyegaard & Co. A/S, Oslo, Norway, a corporation of Norway, and Merck & Co., Inc., Rahway, N.J., a corporation of New Jersey No Drawing. Filed June 13, 1956, Ser. No. 591,008

Claims priority, application Norway June 15, 1955

4 Claims. (Cl. 167—74.6)

The present invention relates to a process for the making of a substance which causes leucocytosis in human beings and animals. As starting material for the process is used liver extract obtained from the liver of animals, especially cattle in a per se known way.

By the present method the inventors have succeeded in producing substances which contain the leucocytosis factor in an extremely high concentration and in a particularly pure state, free from impurities of a harmful nature. The substance obtained conformably with this method has proved to be active on human beings in doses of 1 mg. a day or less, whereas previously such substances have not, as far as the applicants know, been produced with effect in doses of less than 30 mg. a day.

The stimulating effect, by oral administration of whole liver on leucocytosis has been known for a long time, and it is also known that a similar effect can be obtained by parenteral administration of liver extracts. It has also been established that liver extract has a distinct effect on the leucocyte count also in healthy individuals. By parenteral introduction of liver extract a leucocytosis is caused which normally reaches a maximum in the course of 5–6 hours after intramuscular injection of the extract, with a rise in the leucocyte count of about 100%. It has further been established that the leucocytosis is due to an increase of the granulocytes, with simultaneous shift to the left in the distribution of the granulocytes.

This effect of liver extract on the leucocyte count has also been utilized therapeutically, by use of liver extract injections in cases of leucopenia, especially of agranulocytosis.

Thus it is known that ordinary liver extract contains an active principle which causes leucocytosis in human beings and animals.

Ordinary liver extracts consist of aqueous extracts from fresh liver with or without previous proteolysis, as a rule followed by removal of proteins by precipitation with alcohol, with or without subsequent extraction with water-saturated phenol, addition of ether to the phenol and re-extraction of the phenolether phase with water. To remove histamine and other amines which have harmful side effects, such liver extracts designed for injection are usually treated with permutite. Such liver extracts find extensive application in therapy and are particularly valuable in cases of pernicious anemia. The therapeutical value of such liver preparations is assumed to depend in a substantial degree on their content of vitamin $B_{12}$.

A leucocytosis factor has earlier been said to have been isolated from liver extract. This factor is said to have been obtained in crystalline form by fractionated precipitation with acetone of an aqueous liver extract. It did not contain phosphoric acid, and was active in a dose of 30 mg. a day. This factor must in such case be different from the factor to which this invention relates, which is active in doses of less than 1 mg. and which has distinctly acid properties and contains phosphorus. Further, a fat-soluble leucocytosis factor has previously been described, found in the unsaponifiable part of fat from certain organs, bone-marrow, spleen, red blood-corpuscles and liver. This lipoid factor is also different from the water-soluble leucocytosis factor which this invention relates to.

In carrying out this method according to the invention liver extract made in various ways can be used. For example, one may start from liver extract produced from the liver of cattle and use proteolysis, removal of foreign matter by precipitation with alcohol, extraction of the solution, after removal of the alcohols, with liquid water-saturated phenol, after which the phenol phase is diluted with ether and the phenol-ether phase finally extracted with water, which now contains the leucocytosis factor.

In the method according to the invention, the starting material is usually liver extracts, and the process is performed as follows:

To the aqueous liver extract is added alkali to such extent that the extract is adjusted at a pH between 5 and 10, and from the extract is precipitated a leucocytosis-containing factor by addition of an acetate, the cation of which is one of the metals from the group barium, calcium or lead, and alcohol, and the precipitation thus formed is separated from the solution and dissolved in water, after which the aqueous solution is treated with an acid ion exchange resin, by which the said metals and impurities are adsorbed to the ion exchange resin, while the solution contains the leucocytosis factor. It should be noted that this substance, calculated on the basis of clinical activity and content of solids, represents an approximately fifty-fold enrichment in comparison with the starting material. The solution separated from the ion exchange resin is then treated with a basic ion exchange resin, which absorbs or binds the leucocytosis factor, and this latter ion exchange resin is treated with diluted ammonia, and from the aqueous ammonia solution thus obtained a substance is recovered by evaporation and drying, which contains the leucocytosis factor in a highly enriched form.

Attention is drawn to the fact that the various solutions obtained by the successive steps mentioned will suitably be subjected to refinement in per se known ways, when this is desirable, before the solutions are treated further in the next stage or stages of the process. Thus, the solution treated with the acid ion exchange resin will suitably be treated with activated carbon, for removal of certain carrier substances, before the solution is treated with the basic exchange resin.

The said final evaporation is suitably effected in a vacuum, and the drying performed by the freezing method. A yellowish-brown substance is then obtained which is clinically active in a dose of about 1 mg. This represents an enrichment of approximately 2500 times relative to the starting material. It appears from the fractionation methods employed that the leucocytosis factor chemically acts like an acid substance.

Before precipitation of the liver extract with acetate and alcohol the liquid is with advantage adjusted to a pH of 8–8.4, preferably 8.2.

Further, it has been found that it is most advantageous to use barium acetate and alcohol as a precipitating agent.

Treatment of the basic ion exchange resin which has absorbed the leucocytosis factor, is effected with particular advantage by means of aqueous ammonia containing ammonia in a concentration of 0.1–2 N, preferably 0.5 N.

According to one embodiment of the invention the precipitate obtained by means of barium acetate, calcium acetate or lead acetate is decomposed with diluted sulphuric acid and the difficultly soluble sulphate thus formed is separated from the solution, which is then treated further, as described.

It has furthermore been found that the concentrated substance thus obtained can be isolated and purified further by subjecting the aqueous solution of the substances to electrophoresis after addition of an alkaline buffer substance to the solution, whereby the active substance migrates towards the anode. This enriched fraction is concentrated and the active substance is obtained from the concentrated product. For the electrophoresis a buffer substance is used with advantage which gives the solution a pH of 8–9, and to obtain this it is convenient to use sodium bicarbonate.

For clarification of the invention we shall describe a couple of examples of the procedure.

Example 1

To 600 ml. of a liver extract (from 6 kg. fresh liver), prepared in the usual way from fresh liver of cattle by proteolysis with papain, precipitation of the proteolysate with alcohol, evaporation of the filtrate and extraction of the concentrated solution with water-saturated phenol, dilution of the phenol extract with ether and extraction of the phenolether mixture with water, a 5% potassium hydroxide solution was added to give a pH of 8.2. 7.32 g. barium acetate $Ba(CH_3CO_2)_2H_2O$ was added, and the solution allowed to stand overnight at 0° C. The small quantity of precipitate formed was removed by centrifugation. To the supernatant was added 2.8 liter 96% alcohol, and the precipitate formed was the next day centrifugated from the solution, washed with alcohol and then with ether, and dried. The precipitate weighed 10.95 g.

The precipitate was dissolved in 500 ml. water and allowed to drip through a column containing 140 ml. acid ion exchange resin (Amberlite IR–120 (H), moist 40–60 mesh, this being a strongly acid cation exchange resin of the nuclear sulfonic acid type). The column was washed with water until the solution which dripped through assumed a pH of 5.5–6. The solution was then colorless. To the solution was then added 2 N NaOH to pH 6.5; it was concentrated in a vacuum and finally freeze-dried. The product weighed in dry state 2.9 g.

0.5 g. of the product (equivalent to 1 kg. fresh liver) was dissolved in 50 ml. water. To the solution, which had a pH of 6.6, was added 1.5 g. carbon (Norit X, index=32), which had in advance been washed with water and then with alcohol. After being allowed to stand for 19 hours the carbon was filtered from the solution and washed with water until the filtrate was colorless. The collected filtrates were concentrated in a vacuum and weighed, after being freeze-dried, 0.250 g.

0.175 g. of this material was dissolved in 20 ml. water, and 2 N NaOH was added to pH 8.7. The solution was then passed slowly through a column of basic ion exchanger (Amberlite I–R4B (OH); 2.2 cm. x 6 cm., 40–60 mesh, this being a weakly basic anion exchange resin of the amine type). The ion exchanger had in advance been regenerated with 10% NaOH and washed with water until free from alkali immediately before use. After the solution had been percolated through the column it was washed with water until the total volume of effluent was about 100 ml. The effluate weighed 0.15 g. after being freeze-dried.

The column was then slowly eluted with altogether 260 ml. 0.5 N $NH_3$. This eluate was concentrated in vacuum and at the end freeze-dried. It yielded 5–6 mg. of a slightly yellowish brown product $$(\epsilon^{1\%}_{260\ \text{millimicrons}} = 30,\ \text{phosphorus} = 1\%$$

The product gave a slightly positive ninhydrin reaction, and produced leucocytosis in human beings with a dose of about 1 mg.

We shall now describe the further treatment of a product obtained in the manner described above, with a view to isolating and purifying it still further by means of electrophoresis.

0.169 g. of this material (equivalent to 14.6 kg. fresh liver) is dissolved in 7.5 ml. water and placed in a Whatman 3 mm. paper in a continuous electrophoresis apparatus near the negative electrode, after addition of 0.25% tricresol to prevent growth of microorganisms. As buffer was used 0.025 molar sodium carbonate. A voltage of 600 volt is applied, which gives a strength of current of about 9.5 milliamperes. The part of the material which has moved toward the anode and which has the highest ultraviolet absorption at 260 millimicrons contains the active material. The solution containing this fraction is concentrated in a vacuum to about 70 ml., and is passed through a column containing an acid ion exchanger in hydrogen form (Amberlite IR–120 (H), 2 cm. x 11 cm.), whereby the sodium bicarbonate is removed.

The column is then washed with water until the effluate shows little or no ultraviolet absorption. The collected eluates are adjusted to pH=6 with sodium hydroxide solution, are concentrated in a vacuum and freeze-dried. 77 mg. of a highly active material is isolated.

Example 2

A commercial liver extract produced by extraction from fresh liver with hot water and deproteinizing by precipitation with alcohol, was in normal way extracted with aqueous phenol. The phenol phase was diluted with ether, and the mixture extracted with water, and the water phase precipitated with barium acetate in the presence of alcohol, as described in Example 1.

110 g. barium precipitate, equivalent to 50 kg. fresh liver, was dissolved in 5.25 liters water and conducted through a column filled with acid ion exchanger (IR–120 (H), 6 x 50 cm.). The column was washed with 10 liters water. The combined effluates precipitated small quantities of material after being allowed to stand. The supernatant was decanted from the small precipitation and neutralized to pH=6 with soda lye. The solution was then concentrated in vacuum to 2.95 liters. Amyl alcohol was added to prevent foaming during evaporation. 72.5 g. active carbon (Norit X) was added to the solution, which was shaken and allowed to stand at room temperature for 19 hours. The solution was filtered through a Büchner funnel, and the carbon washed with 3 liters of water. The combined filtrates were adjusted to pH=9.2 by means of 2 N sodium hydroxide solution, and diluted acetic acid. The solution was then passed through a column with basic ion exchanger (IR–4B (OH), 6 x 43 cm. in regenerated form), and the column was washed with water until the effluate amounted to 11.850 liters. The colorless effluate had an ultraviolet absorption at 260 millimicrons of 0.015, and had a solid content of 4.9 g. per liter.

The column was then eluted slowly with about 18 liters 0.5 N ammonia water, which was concentrated in a vacuum and finally dried by freezing. In this way 1.128 g. solid was obtained. 0.125 g. of this substance was dissolved in 5 ml. water and 10 microliters tricresol added. The solution was placed on filter paper (Whatman No. 3, 3 mm.) in a continuous electrophoresis apparatus with application of a 0.025 M carbonate of soda buffer, and the electrophoresis effected with a voltage of 600 volts (8.5–9 microamperes). The electrophoresis apparatus was fitted with 20 drip-points and the corresponding number of fractions were collected in the course of 2 days. The solution was placed on paper between drip-points 16 and 17. The anode was placed near drip-point No. 1, the cathode near drip-point No. 20. Fractions 6–12, which showed the greatest absorption at 260 millimicrons, were combined and conducted through a column with acid ion exchanger (IR–120 (H), 2 x 11 cm.), after which the column was washed with water until pH was 5.5 in the effluate. The combined effluates were concentrated somewhat in a vacuum for removal of carbon dioxide, and then neutralized with 2 N NaOH. After concentration in a vacuum and freeze-drying the solution yielded 30.45 mg. of a slightly yellowish substance, which in a dose of 0.64 mg. was injected intramuscularly, induced leucocytosis. For example, 0.64 mg. of this preparation injected intramuscularly into a healthy person showed the following picture of the leucocytosis effect:

Number of leucocytes per mm.³: Before the injection—8200. At one hour intervals after the injection—9.000, 8.800, 7.800, 14.400, 14.000, 15.600.

We claim:

1. The process for producing from an aqueous liver extract a water-soluble substance with distinctly acid properties and containing phosphorus and effective to increase the level of white blood corpuscles in human being and animals, comprising; adjusting the pH of said extract by the addition of alkali until it is in the range of 8 to 8.4; adding to the solution an acetate the cation of which is a metal selected from the group consisting of barium, calcium and lead; adding alcohol to the solution and separating the resulting precipitate; dissolving the precipitate in water; contacting the aqueous solution with an acid ion exchange material for removing the metallic cations and cation-like impurities; contacting the eluate with a basic ion exchanger; eluting the basic ion exchanger wth diluted ammonia water; and concentrating the eluate to obtain a water-soluble substance having a significant ultra-violet absorption at 260 millimicrons.

2. The process as set forth in claim 1 supplemented by dissolving the end product thereof in water; adding an alkaline buffer to the solution to produce a pH of about 8 to 9; subjecting the buffered solution to electrophoresis; and withdrawing for use that part of the material which has moved toward the anode and which has a maximum ultra-violet absorption at about 260 millimicrons.

3. The water-soluble substance having distinctly acid properties and a significant ultra-violet absorption at 260 millimicrons, containing phosphorus and effective upon injection in human beings and animals to increase the level of white blood corpuscles therein, and which is the product of the process of claim 1.

4. The water-soluble substance having distinctly acid properties and a significant ultra-violet absorption at 260 millimicrons, containing phosphorus and effective upon injection in human beings and animals to increase the level of white blood corpuscles therein, and which is the product of the process of claim 2.

References Cited in the file of this patent

UNITED STATES PATENTS

| | | |
|---|---|---|
| 2,407,096 | Pfiffner | Sept. 3, 1946 |
| 2,628,186 | Shive | Feb. 10, 1953 |
| 2,656,300 | McCormack | Oct. 20, 1953 |
| 2,684,322 | Colovos | July 20, 1954 |

OTHER REFERENCES

Cline: J.A.C.S., vol. 67, December 1945, p. 2273.